US011157605B2

(12) United States Patent
Guo et al.

(10) Patent No.: US 11,157,605 B2
(45) Date of Patent: Oct. 26, 2021

(54) SECURITY CONTROL METHOD AND DEVICE OF APPLICATION, AND ELECTRONIC DEVICE

(71) Applicant: Guangdong Oppo Mobile Telecommunications Corp., Ltd., Guangdong (CN)

(72) Inventors: Ziqing Guo, Guangdong (CN); Haitao Zhou, Guangdong (CN); Fangfang Hui, Guangdong (CN); Xiao Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 210 days.

(21) Appl. No.: 16/660,066

(22) Filed: Oct. 22, 2019

(65) Prior Publication Data
US 2020/0050748 A1 Feb. 13, 2020

Related U.S. Application Data

(63) Continuation of application No. PCT/CN2019/081739, filed on Apr. 8, 2019.

(30) Foreign Application Priority Data

Apr. 12, 2018 (CN) .......................... 201810326273.3
Apr. 12, 2018 (CN) .......................... 201810327440.6

(51) Int. Cl.
G06F 21/00 (2013.01)
G06F 21/32 (2013.01)
(Continued)

(52) U.S. Cl.
CPC .............. G06F 21/32 (2013.01); G06F 21/57 (2013.01); G06F 21/629 (2013.01); G06K 9/00288 (2013.01); G06K 9/00906 (2013.01)

(58) Field of Classification Search
CPC ........ G06F 21/32; G06F 21/57; G06F 21/629; G06F 21/86; G06F 21/74; G06F 21/12;
(Continued)

(56) References Cited

U.S. PATENT DOCUMENTS 7,813,822 B1 * 10/2010 Hoffberg .......... H04N 21/44222
700/94
2002/0136435 A1 * 9/2002 Prokoski ............ G06K 9/00906
382/118
(Continued)

FOREIGN PATENT DOCUMENTS

CN 101047701 A 10/2007
CN 101827361 A 9/2010
(Continued)

OTHER PUBLICATIONS

ISR with English translation for PCT application PCT/CN2019/081739 dated Jul. 9, 2019.
(Continued)

Primary Examiner — Mahfuzur Rahman
(74) Attorney, Agent, or Firm — Young Basile Hanlon & MacFarlane, P.C.

(57) ABSTRACT

The present disclosure provides a security control method and device of an application, and an electronic device. The method includes: determining whether running information of the application meets a preset security control condition; calling a preset service if the running information of the application meets the preset security control condition, the preset service being configured to enable the application to run in a trusted execution environment; and executing an authentication service corresponding to the running information of the application in the trusted execution environment.

15 Claims, 8 Drawing Sheets

(51) Int. Cl.
*G06F 21/57* (2013.01)
*G06F 21/62* (2013.01)
*G06K 9/00* (2006.01)

(58) Field of Classification Search
CPC .......... G06K 9/00288; G06K 9/00906; G06K 9/4642; G06K 9/2018; G06K 2209/401; G06K 9/00228; H04L 63/0861
See application file for complete search history.

(56) References Cited

U.S. PATENT DOCUMENTS

| | | | |
|---|---|---|---|
| 2015/0242605 A1* | 8/2015 | Du | G06F 21/32 726/7 |
| 2015/0254622 A1 | 9/2015 | Matsumoto | |
| 2016/0012279 A1* | 1/2016 | Dau | G06K 9/2036 348/77 |
| 2016/0048736 A1 | 2/2016 | Chu et al. | |
| 2016/0180068 A1* | 6/2016 | Das | G06F 21/316 726/7 |
| 2016/0328602 A1 | 11/2016 | Zuo et al. | |
| 2017/0061436 A1 | 3/2017 | Liu et al. | |
| 2017/0086072 A1 | 3/2017 | Mao et al. | |
| 2017/0293763 A1* | 10/2017 | Shear | G06F 21/6218 |
| 2018/0053005 A1 | 2/2018 | Kamal | |
| 2019/0189259 A1* | 6/2019 | Clark | G16H 70/40 |
| 2021/0169417 A1* | 6/2021 | Burton | A61B 5/02055 |

FOREIGN PATENT DOCUMENTS

| | | |
|---|---|---|
| CN | 102522588 A | 8/2012 |
| CN | 102880820 A | 1/2013 |
| CN | 104134034 A | 11/2014 |
| CN | 105590201 A | 5/2016 |
| CN | 105608364 A | 5/2016 |
| CN | 105718925 A | 6/2016 |
| CN | 106027257 A | 10/2016 |
| CN | 106295350 A | 1/2017 |
| CN | 106529275 A | 3/2017 |
| CN | 106778607 A | 5/2017 |
| CN | 107169343 A | 9/2017 |
| CN | 107277053 A | 10/2017 |
| CN | 107392055 A | 11/2017 |
| CN | 107729891 A | 2/2018 |
| CN | 107832677 A | 3/2018 |
| CN | 108595942 A | 9/2018 |
| CN | 108614958 A | 10/2018 |
| EP | 2498529 A1 | 9/2012 |

OTHER PUBLICATIONS

OA with English translation for CN application 201810327440.6 dated Feb. 14, 2019.
OA with English translation for CN application 201810327440.6 dated Apr. 24, 2019.
OA with English translation for CN application 201810326273.3 dated Feb. 14, 2019.
OA with English translation for CN application 201810326273.3 dated Apr. 25, 2019.
Notification of Registration with English translation from SIPO for CN application 201810327440.6 dated Sep. 6, 2019.
Search report for EP application 19785190.0 dated Jun. 29, 2020.
Face Recognition Systems Under Spoofing Attacks; Ivana Chingovska, Nesli Erdogmus, André Anjos and Sébastien Marcel; pp. 165-194.
Chinese First Examination Opinion with English Translation for CN Application 201911108753.3 dated Aug. 2, 2021 (32 pages).
Indian Examination Report for IN Application 201917049150 dated Jun. 4, 2021. (8 pages).

* cited by examiner

SECURITY CONTROL METHOD AND DEVICE OF APPLICATION, AND ELECTRONIC DEVICE

CROSS-REFERENCE TO RELATED APPLICATION(S)

This application is a continuation application of International Application No. PCT/CN2019/081739, filed on Apr. 8, 2019, which claims priority to Chinese patent applications Serial No. 201810326273.3 and 201810327440.6, both filed on Apr. 12, 2018, the entire contents of all of which are incorporated herein by reference.

TECHNICAL FIELD

The present disclosure relates to an electronic device technology field, and more particularly, to a security control method of an application, a security control device of an application, and an electronic device.

BACKGROUND

In many application scenarios, an authentication service is required in an application. The authentication service is used, for example, to verify an identity of a user who uses an electronic device to which the application belongs, for example, by face recognition. After the authentication is passed, subsequent operations such as screen unlocking and electronic payment may be performed.

SUMMARY

Embodiments of the present disclosure provide a security control method of an application, a security control device of an application, an electronic device and a computer readable storage medium.

The security control method of embodiments of the present disclosure includes: determining whether running information of an application meets a preset security control condition; calling a preset service if the running information of the application meets the preset security control condition, the preset service being configured to enable the application to run in a trusted execution environment; and executing an authentication service corresponding to the running information of the application in the trusted execution environment.

The security control device of embodiments of the present disclosure includes a processor and a memory. A trusted execution environment runs in the processor. The memory is configured to store program codes executable in the trusted execution environment. The processor is configured to read the program codes stored in the memory, so as to implement the security control method according to embodiments of the present disclosure.

The electronic device of embodiments of the present disclosure includes an image sensor, a memory, a micro-control unit (MCU), and a processor. A trusted execution environment runs in the processor. The memory is configured to store program codes executable in the trusted execution environment. The MCU is a dedicated hardware of the trusted execution environment, coupled to the image sensor and the processor respectively, and configured to control the image sensor to image and transmit imaging data to the processor. The processor is configured to execute the security control method described above, when executing the executable program codes.

The computer readable storage medium of embodiments of the present disclosure is stored thereon with a computer program. When the computer program is executed by the processor, the above-described security control method of the application is performed.

Additional aspects and advantages of the present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the accompanying drawings, in which.

DETAILED DESCRIPTION

Figure 1:
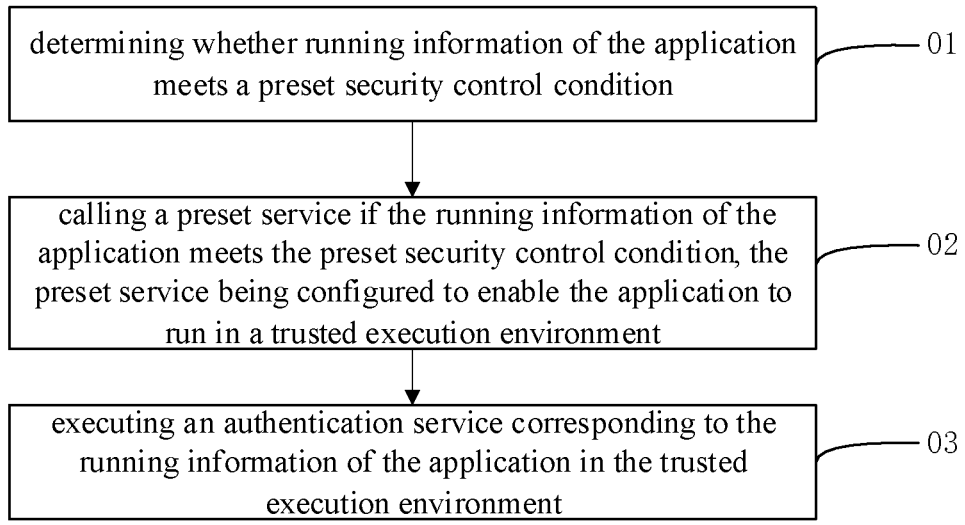
FIG. 1 is a schematic flow chart of a security control method of an application according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure. Rather, embodiments of the present disclosure include all changes, modifications, and equivalents falling within the spirit and scope of the appended claims.

A security control method and device of an application, an electronic device and a storage medium of embodiments of the present disclosure will be described below with reference to the accompanying drawings.

At present, in many application scenarios, an authentication service is required in an application. The authentication service is used, for example, to verify an identity of a user who uses an electronic device to which the application belongs, for example by face recognition. After the authentication is passed, subsequent operations such as screen unlocking and electronic payment may be performed.

As illustrated in FIG. 1, an implementation of the present disclosure provides a security control method of an application, which includes the following operations.

At block 01, it is determined whether running information of an application meets a preset security control condition.

At block 02, a preset service is called if the running information of the application meets the preset security control condition, wherein the preset service is configured to enable the application to run in a trusted execution environment.

At block 03, an authentication service corresponding to the running information of the application is executed in the trusted execution environment.

Figure 2:
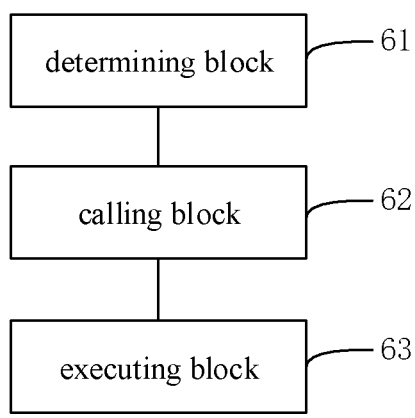
FIG. 2 is a schematic block diagram of a security control device of an application according to embodiments of the present disclosure.

As illustrated in FIG. 2, an implementation of the present disclosure provides a security control device 60 of an application. The security control device 60 has a trusted execution environment. The security control device 60 includes a determining block 61, a calling block 62, and an executing block 63. The determining block 61 is configured to determine whether the running information of the application meets the preset security control condition. The calling block 62 is configured to call the preset service, if the running information of the application meets the preset security control condition, the preset service being configured to enable the application to run in the trusted execution environment. The executing block 63 is configured to execute the authentication service corresponding to the running information of the application in the trusted execution environment.

In other words, the act at block 01 may be implemented by the determining block 61, the act at block 02 may be implemented by the calling block 62, and the act at block 03 may be implemented by the executing block 63.

In the security control method and the security control device 60 of the implementation of the present disclosure, the preset service is called if the running information of the application meets the preset security control condition, in which the preset service is configured to enable the application to run in the trusted execution environment. The authentication service corresponding to the running information of the application is executed in the trusted execution environment, which improves the security of the authentication service in terms of the running environment.

The security control method and the security control device of the implementation of the present disclosure will be described in two embodiments.

First Embodiment

In the related art, the application performs the authentication service in a software environment with a low security.

In response to this problem, the embodiment of the present disclosure provides a security control method of an application, which first determines whether the application is a preset application before executing the authentication service. If the application is the preset application, the preset service is called, in which the preset service is configured to enable the application to run in the trusted execution environment. The authentication service of the application is executed in the trusted execution environment, which improves the security of the software environment when the application executes the authentication service, and improves the security and reliability of the authentication service from another dimension.

Figure 3:
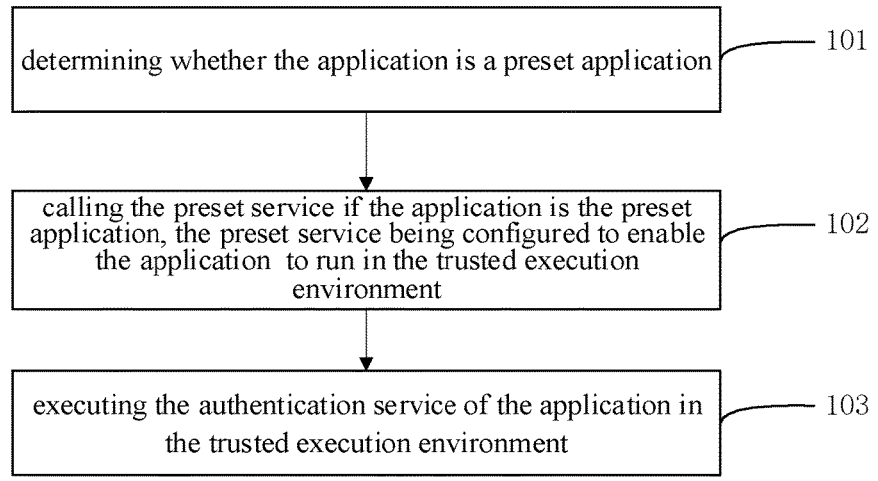
FIG. 3 is a schematic flow chart of a security control method of an application according to embodiments of the present disclosure.

FIG. 3 is a schematic flow chart of a security control method of an application according to embodiments of the present disclosure.

Figure 4:
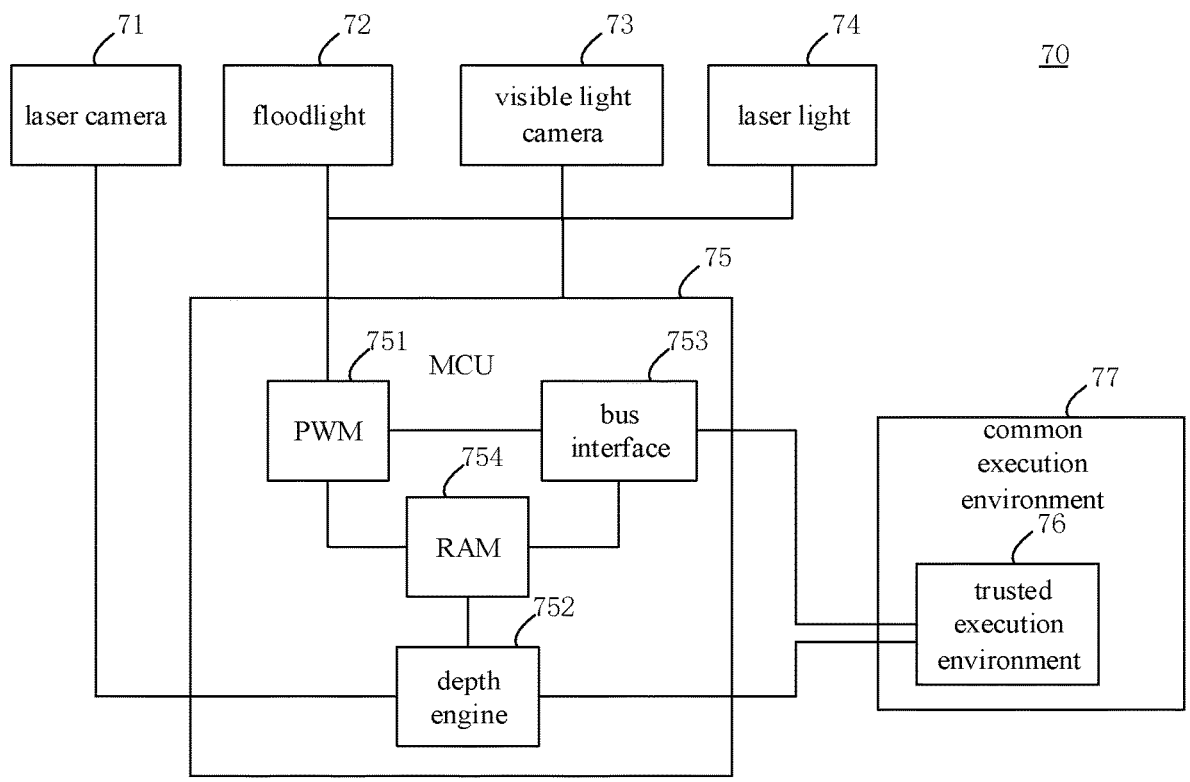
FIG. 4 is a schematic block diagram of an electronic device according to embodiments of the present disclosure.

The security control method may be applied to an electronic device 70. Referring to FIG. 4, the structure of the electronic device is illustrated.

FIG. 4 is a schematic block diagram of an electronic device 70 according to embodiments of the present disclosure.

As illustrated in FIG. 4, the electronic device 70 includes a laser camera 71, a floodlight 72, a visible light camera 73, a laser light 74, and a microcontroller unit (MCU) 75. The MCU 75 includes a pulse width modulation (PWM) 751, a depth engine 752, a bus interface 753, and a random access memory (RAM) 754.

The PWM 751 is configured to modulate the floodlight 72 to make it emit infrared light, and to modulate the laser light 74 to make it emit laser light, which may have a specific pattern. The laser camera 71 is configured to collect a structured light image or visible image of an imaging object. The structured light image is an image formed by the laser light after being modulated by the imaging object. The depth engine 752 is configured to calculate depth data corresponding to the imaging object according to the structured light image. The bus interface 753 is configured to send the depth data to the processor. The executable program codes running on the processor use the depth data to perform the corresponding operations. The bus interface 753 includes an MIPI bus interface, an I2C synchronous serial bus interface, and an SPI bus interface.

As illustrated in FIG. 3, the act at block 01 includes the act at block 101. At block 101, it is determined whether the application is a preset application.

The running information of the application includes a type of the application, the preset application is an application that needs to execute related services in the trusted execution environment 76, and the preset application may be, for example, a security application or an application that needs to enter a protection state, which is not be limited here.

The preset application according to the embodiments of the present disclosure may be set by the user according to his own needs, or may be preset by a factory setting program of the electronic device 70, which is not limited here.

In the specific implementation process of the embodiments of the present disclosure, a preset application identifier library may be pre-established, and the identifiers of a plurality of preset applications are recorded in the library. The operating system of the electronic device 70 reads the identifier of the application currently performing the security control, and queries the identifier in the preset application identifier library. If the preset application identifier library contains the identifier, the application may be determined to be the preset application; otherwise, it is determined that the application is not the preset application. The acts at blocks 102 and 103 are triggered after determining that the application is the preset application.

The act at block 02 includes the act at block 102. At block 102, if the application is the preset application, the preset service is called, the preset service is configured to enable the application to run in the trusted execution environment 76.

The act at block 03 includes the act at block 103. At block 103, the authentication service of the application is executed in the trusted execution environment 76.

The authentication service corresponding to the running information of the application may be the authentication service in the application.

Figure 5:
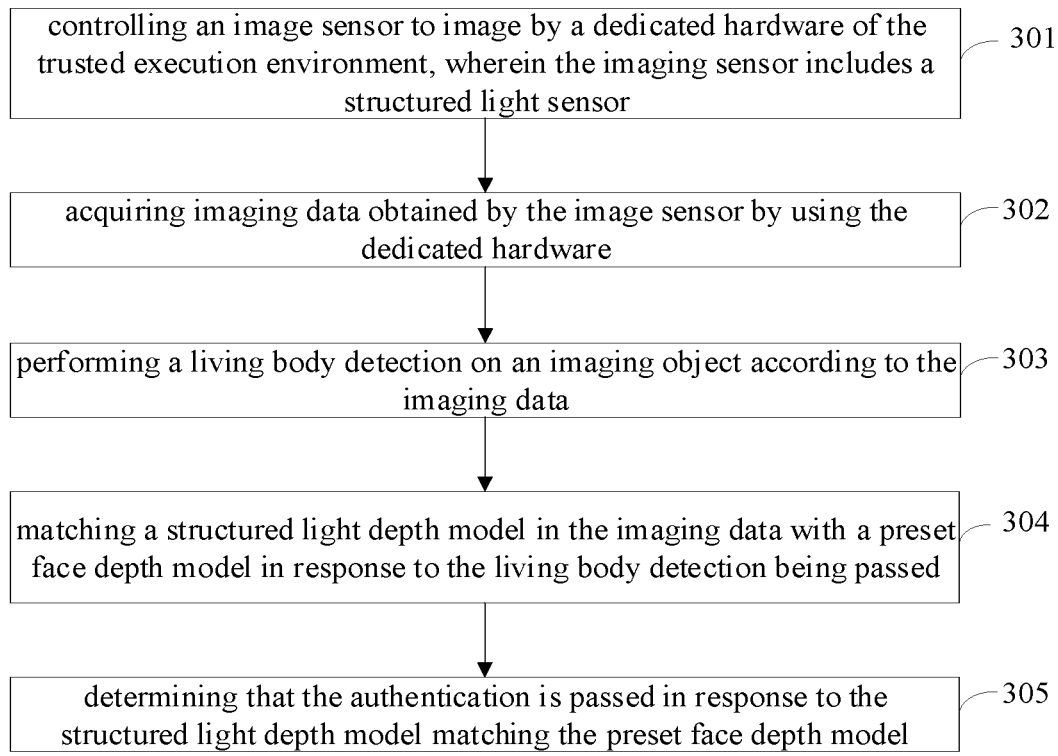
FIG. 5 is a schematic flow chart of a security control method of an application according to embodiments of the present disclosure.

In some embodiments, as illustrated in FIG. 5, the act at block 103 of executing the authentication service of the application in the trusted execution environment 76, may include the following operations.

At block 301, an image sensor is controlled to perform imaging by a dedicated hardware of the trusted execution environment 76, wherein the image sensor includes a structured light sensor.

The trusted execution environment 76 is a secure area on a host processor of the electronic device (including a smartphone, a tablet) that ensures the security, confidentiality, and integrity of codes and data loaded into the environment. The trusted execution environment 76 provides an isolated execution environment that provides security features including isolated execution, integrity of executable program codes, confidentiality of trusted data, secure storage, and the like. In summary, the trusted execution environment 76 provides an execution space of a higher level of security than common mobile operating systems such as ISO, Android.

In this embodiment, the preset service is configured to enable the application to run in the trusted execution environment 76, which improves the security of the authentication service in terms of the running environment.

When the authentication service of the application, such as electronic payment and electronic device unlocking, is executed in the trusted execution environment 76, the image sensor is controlled to image by the dedicated hardware of the trusted execution environment 76. The dedicated hardware may be an MCU, and the image sensor may include the structured light sensor.

In order to further improve the security, the structured light image may be sent to the MCU 75, and the structured light image is processed in the MCU 75 in form of hardware. Compared with directly sending the data to the application for processing, the data has been calculated in the hardware, and the hacker cannot obtain the original data, thus making the data more secure.

In this embodiment, the structured light sensor may include a laser camera 71 and a laser light 74. The MCU 75 may modulate the laser light 74 on the electronic device 70 to make it emit laser light that is projected onto the imaging object. The laser light is obstructed and modulated by the imaging object, and reflected by the imaging object. The laser camera 71 captures the laser light reflected by the imaging object for imaging.

In this embodiment, since the characteristics of the body parts of individuals are generally different, the body part may be selected as the imaging object. For example, the imaging object may be a human face, a face organ (eye, nose, mouth) or hands.

At block 302, imaging data obtained through imaging of the image sensor is acquired by the dedicated hardware.

In this embodiment, the imaging data obtained through the imaging of the image sensor, for example, depth data obtained by imaging of the structured light sensor, may be acquired by the dedicated hardware.

At block 303, a living body detection is performed on the imaging object based on the imaging data.

In this embodiment, the living body detection of the imaging object may be performed using the depth data of the imaging data.

In detail, a structured light depth model is constructed according to the depth data, and the target organ is identified from the structured light depth model. In detail, the target organ is identified in the structured light depth model by comparing the structured light depth model with the pre-stored structured light depth models of facial organs.

When the imaging object is a living body, the imaging object cannot always remain stationary. When an organ is in motion, its depth data also changes. Therefore, in this embodiment, the target organ is tracked to determine whether the target organ is in motion.

After the target organ is identified, the depth map of the imaging object is continuously acquired to obtain multiple consecutive depth maps. The depth data of the same organ in the multiple consecutive depth maps is compared to determine if the organ is in motion. When the depth data of the same organ in the multiple consecutive depth maps changes, it is determined that the organ is in motion.

When the target organ is in motion, it indicates that the imaging object is not an imitated object, such as a photo, and it may be determined that the imaging subject is a living body. When the target organ is in the stationary state, it may be determined that the imaging object is not a living body, and may be an imitated object such as a photo.

In this embodiment, by identifying the target organ from the structured light depth model, and by tracking the target organ, whether the target organ is in motion is determined, and further whether the imaging object is a living body is determined, such that the accuracy of the living body detection is high.

At block 304, the structured light depth model constructed according to the depth data of the imaging data is matched with a preset face depth model in response to the living body detection being passed.

When the imaging object passes the living body detection, the structured light depth model of the imaging object is matched with the preset face depth model.

As a possible implementation, the structured light depth models of respective facial organs in the constructed structured light depth model may be compared with the depth models of respective organs in the preset face depth model. When the similarity exceeds the preset threshold, the structured light depth model may be considered to match the preset face depth model.

It can be understood that the preset face depth model here is constructed by using the depth data in the structured light image, which is pre-stored and obtained by imaging the face of the owner of the electronic device 70 through the structured light image sensor. The preset face depth model is used for authentication service.

At block 305, it is determined that the identity authorization is passed in response to the structured light depth model matching the preset face depth model.

When the structured light depth model matches the preset face depth model, it is determined that the identity authentication is passed, and subsequent operations, such as electronic payment, electronic device unlocking, and the like, may be performed.

When the living body detection is failed, the message that the living body detection is failed may be returned, or when the structural light depth model does not match the preset face depth model, the message that the living body detection is failed may be returned.

In this embodiment, the living body detection of the imaging object is first performed according to the imaging data, and after the living body detection is passed, the identity authentication is executed according to the structural light depth model, thereby avoiding the case in which the imitated object such as photo is used to pass the identity authentication, and improving the security and reliability of identity authentication using face.

In the above embodiments, the image sensor that is controlled to image by the dedicated hardware may further include an infrared sensor. The infrared sensor includes a laser camera 71 and a floodlight 72. When controlling the infrared sensor to image, the PWM 751 may modulate the floodlight 72 on the electronic device 70 to make it emit infrared light and project the infrared light onto the imaging object. The infrared light is obstructed by the imaging object, and reflected by the imaging object. The laser camera 71 captures the infrared light reflected by the imaging object for imaging.

When performing the living body detection, the infrared image obtained by imaging of the infrared sensor may be used to identify whether the imaging object of the infrared image is a living body.

Figure 6:
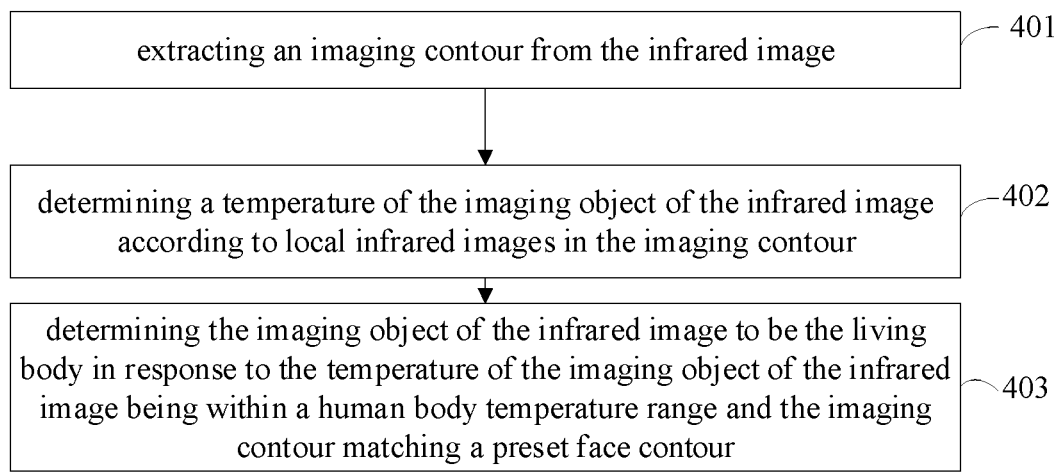
FIG. 6 is a schematic flow chart of a method of performing living body recognition based on infrared image according to embodiments of the present disclosure.

FIG. 6 is a schematic flow chart of a method of performing living body recognition based on infrared image according to embodiments of the present disclosure.

As illustrated in FIG. 6, the living body detection includes the following operations.

At block 401, an imaging contour is extracted from the infrared image.

In this embodiment, the imaging contour may be extracted according to edge pixel points in the infrared image.

At block 402, a temperature of the imaging object of the infrared image is determined based on local infrared images in the imaging contour.

In this embodiment, the imaging contour may be divided into a plurality of portions, the temperature of each local infrared image is determined, and the temperatures of respective local infrared images are added and averaged to obtain an average value, and the average value is taken as the temperature of the imaging object in the infrared image.

At block 403, the imaging object of the infrared image is determined to be a living body in response to the imaging contour matching a preset face contour, and the temperature of the imaging object of the infrared image being within a body temperature range.

In this embodiment, the imaging contour is matched with the preset face contour. As an example, the imaging contour and the preset face contour may be matched in segments. When the degree of similarity of each pair of segments exceeds the corresponding preset threshold, the imaging contour may be considered to match the preset face contour, i.e., the imaging object is a pre-stored imaging object.

When the imaging contour is compared with the preset face contour, the face contour may be divided into an upper part and a lower part by using the eyebrows as a boundary. Because the upper part (including the eyebrows) is affected by the shape of the eyebrows and the hairstyle, and may have relatively large change, the credibility of the upper part is relatively low. However, the lower part, such as eyes, eyebrows, nose, and mouth, is relatively fixed. Therefore, the preset similarity threshold of the upper part is relatively less than that of the lower part.

The upper part and lower part are respectively compared. When the similarity between the upper part of the imaging contour and the upper part of the pre-stored face contour exceeds the corresponding preset threshold, and the similarity between the lower part of the imaging contour and the lower part of the pre-stored face contour exceeds the corresponding preset threshold, the imaging contour may be considered to match the pre-stored face contour.

When the imaging contour matches the preset face contour, and the temperature of the imaging object of the infrared image is within the body temperature range, the imaging object of the infrared image may be determined to be a living body. Otherwise, it may be considered that the imaging object of the infrared image is not a living body.

In this embodiment, whether the imaging object is a living body is determined by determining whether the imaging contour matches the preset face contour and whether the temperature of the imaging object is within the body temperature range, thereby improving the accuracy of the living body identification.

In the above embodiment, the image sensor that is controlled to turn on by the dedicated hardware may include an infrared sensor and a visible light sensor, and an infrared image and a visible image are obtained by the infrared sensor and the visible light sensor. In the case of living body detection, the living body detection on the imaging object may be performed according to the infrared image and the visible image.

Figure 7:
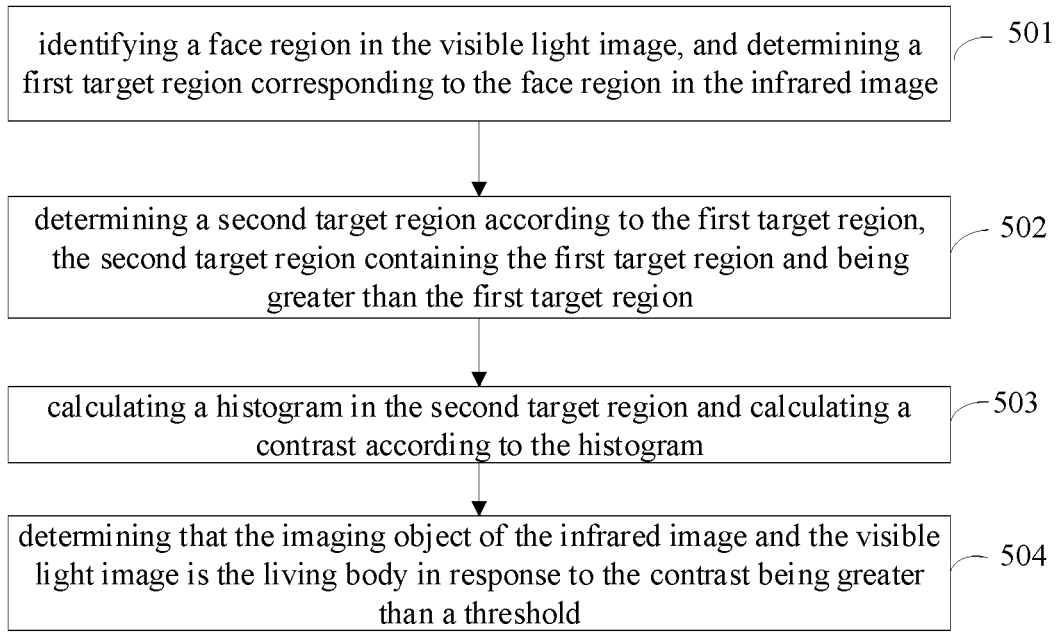
FIG. 7 is a schematic flow chart of a method of performing living body detection based on infrared image and visible image according to embodiments of the present disclosure.

FIG. 7 is a schematic flow chart of a method of performing living body detection based on infrared image and visible image according to embodiments of the present disclosure.

As illustrated in FIG. 7, the living body detection includes the following operations.

At block 501, a face region is identified in the visible image, and a first target region corresponding to the face region is determined in the infrared image.

In this embodiment, the face region is detected on the visible image. When the face region is not detected, the visible image and the infrared image are re-acquired. When a human face is detected, the face region is identified in the infrared image, and the first target region corresponding to the face region in the visible image is determined. It can be understood that the first target region here is a face region in the infrared image.

At block 502, a second target region that contains the first target region and is larger than the first target region is determined according to the first target region.

The range of the first target region is expanded on the infrared image to obtain the second target region. It can be understood that the second target region contains the first target region and is larger than the first target region.

At block 503, a histogram is calculated in the second target region, and the contrast is calculated according to the histogram.

The histogram is calculated in the second target region on the infrared image, as shown in equation (1).

$$C = \Sigma_\delta \delta(i,j)^2 p_\delta(i,j) \tag{1}$$

$\delta(i,j) = |i-j|$ is the grayscale difference between adjacent pixels, $p_\delta(i,j)$ is the pixel distribution probability of grayscale difference between adjacent pixels.

At block 504, it is determined that the imaging object of the infrared image and the visible image is a living body in response to the contrast being greater than a threshold.

When the contrast is greater than a certain threshold, it may be determined that the imaging object of the infrared image and the visible image is a living body. Otherwise, the imaging object is an imitated object.

In this embodiment, the infrared image and the visible image are used to determine whether the imaging object is a living body, improving the accuracy of the living body detection.

Further, in the case of improving the security and reliability of the authentication service, the energy of the electronic device 70 can be saved and the endurance can be improved.

In the embodiments of the present disclosure, when the image sensor that is controlled to image further includes the infrared sensor, the infrared sensor is controlled to image by the dedicated hardware. When the imaging object is determined to be a living body based on the infrared image obtained by the infrared image sensor, the structured light sensor is controlled to image.

In detail, the floodlight is modulated by a dedicated hardware MCU 75 to emit infrared light that is irradiated to the imaging object. The infrared light is blocked and reflected by the imaging object. The infrared sensor receives the infrared light reflected by the imaging object for imaging.

The infrared image imaged by the infrared sensor is obtained by the MCU 75, and the living body detection of the imaging object is performed according to the infrared image. For the specific detection method, reference may be made to the method described in the above embodiments, and details are not described herein again.

When the imaging object is determined to be a living body according to the infrared image, the structured light sensor is controlled to image, such that identity authentication can be performed according to the structured light depth model.

In this embodiment, the infrared sensor is first controlled to image, and after the imaging object is determined to be a living body according to the infrared image, the structured light sensor is controlled to image, so that the structured light sensor does not need to be in a working state all the time, and the energy of the electronic device 70 can be saved and the endurance can be improved.

It can be understood that, in order to improve the speed of the identity authentication, the infrared sensor and the structured light sensor in the image sensor may be synchronously controlled to image, so that after the imaging object is determined to be a living body according to the infrared image, the identity authentication may be performed directly according to the image data obtained by imaging through the structured light sensor, thereby increasing the speed of identity authentication.

In the above embodiments, when the image sensor controlled by the dedicated hardware includes a visible light sensor, an infrared sensor, and a structured light sensor, in order to save energy of the electronic device 70, the visible light sensor and the infrared sensor may be first controlled to image. When the imaging object is determined to be a living body based on the infrared image obtained by the infrared sensor and the visible image obtained by the visible light sensor, the structured light sensor is controlled to image.

For the process of detecting whether the imaging object is a living body according to the visible image and the infrared image, reference may be to the method in the above embodiments, which will not be elaborated here.

In this embodiment, it is determined whether the application is the preset application, and the preset service is called if the application is the preset application, the preset service being configured to enable the application to run in the trusted execution environment 76, and the authentication service of the application is executed in the trusted execution environment 76, thereby improving the security of the authentication service in terms of the running environment.

The embodiments of the present disclosure further provide a security control device of an application.

Figure 8:
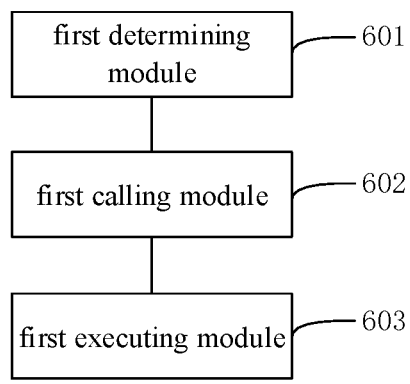
FIG. 8 is a schematic block diagram of a security control device of an application according to embodiments of the present disclosure.

FIG. 8 is a schematic block diagram of a security control device of an application according to the first embodiment of the present disclosure.

As illustrated in FIG. 8, the determining block 61 includes a first determining module 601. The first determining module 601 is configured to determine whether the application is a preset application.

The calling block 62 includes a first calling module 602. The first calling module 602 is configured to call the preset service, if the application is determined to be the preset application, the preset service being configured to enable the application to run in the trusted execution environment.

The executing block 63 includes a first executing module 603. The first executing module 603 is configured to execute authentication service of the application in the trusted execution environment.

Figure 9:
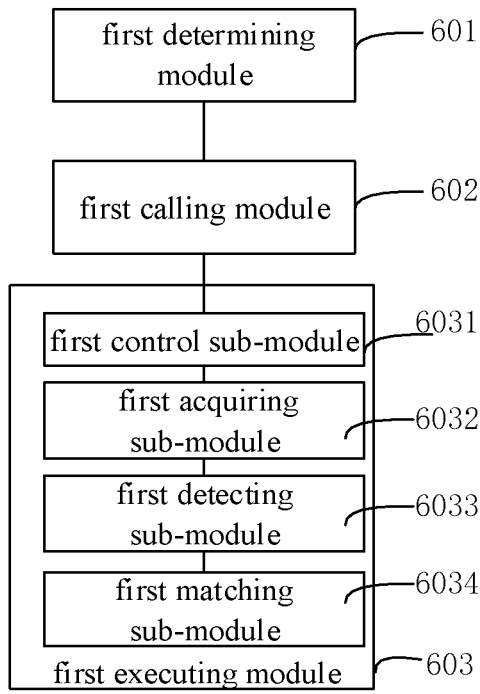
FIG. 9 is a schematic block diagram of a security control device of an application according to embodiments of the present disclosure.

In some embodiments, as illustrated in FIG. 9, the first executing module 603 includes a first control sub-module 6031, a first acquiring sub-module 6032, a first detecting sub-module 6033, and a first matching sub-module 6034.

The first control sub-module 6031 is configured to control the image sensor to image through the dedicated hardware in the trusted execution environment, wherein the image sensor includes the structured light sensor.

The first acquiring sub-module 6032 is configured to acquire imaging data obtained by the image sensor by using the dedicated hardware.

The first detecting sub-module 6033 is configured to perform living body detection according to the imaging data.

The first matching sub-module 6034 is configured to match the structured light depth model in the imaging data with the preset face depth model if the living body detection is passed; and determine that the identity authentication is passed in response to the structured light depth model matching the preset face depth model.

In a possible implementation of this embodiment, the image sensor further includes an infrared sensor, and the imaging data includes an infrared image, and the first detecting sub-module 6033 is further configured to determine whether the imaging object of the infrared image is a living body based on the infrared image in the imaging data.

Further, in a possible implementation of this embodiment, the first detecting sub-module 6033 is further configured to extract an imaging contour from the infrared image, determine the temperature of the imaging object of the infrared image according to the local infrared images in the imaging contour, and determine the imaging object of the infrared image to be a living body, if the temperature of the imaging object of the infrared image is within the human body temperature range and the imaging contour matches the preset face contour.

In a possible implementation of the embodiment, the image sensor further includes an infrared sensor and a visible light sensor, and the imaging data includes an infrared image and a visible image.

The first detecting sub-module 6033 is further configured to: identify a face region in the visible image, and determine a first target region corresponding to the face region in the infrared image; determine a second target region containing the first target region and larger than the first target region based on the first target region; calculate a histogram in the second target region and calculate the contrast according to the histogram; and if the contrast is greater than a threshold, determine that the imaging object of the infrared image and the visible image is a living body.

In a possible implementation manner of this embodiment, the first control sub-module 6031 is further configured to control the infrared sensor in the image sensor to image, and control the structured light sensor to image, if the imaging object is determined to be a living body according to the infrared image imaged by the infrared sensor.

In a possible implementation of this embodiment, the first control sub-module 6031 is further configured to synchronously control the infrared sensor and the structured light sensor in the image sensor to image.

In a possible implementation of this embodiment, the first control sub-module 6031 is further configured to control the infrared sensor and the visible light sensor in the image sensor to image, and control the structured light sensor to image, if the imaging object is determined to be a living body according to the infrared image obtained by the infrared sensor and the visible image obtained by the visible light sensor.

The division of respective modules in the above security control device is for illustrative purposes only. In other embodiments, the security control device may be divided into different modules as needed to complete all or part of the functions of the security control device.

It should be noted that the foregoing illustration of the embodiments of the security control method of the application is also applicable to the security control device of the application of the embodiments, and therefore will not be elaborated here.

With the security control device 60 of this embodiment of the present disclosure, it is determined whether the application is the preset application, and if the application is the preset application, the preset service is called, the preset service being configured to enable the application to run in the trusted execution environment, and the authentication service of the application is executed in the trusted execution environment, which improves the security of the authentication service in terms of the running environment.

Second Embodiment

In the related art, the authentication service and subsequent operations such as screen unlocking and electronic payment are performed in the security environment of the same level. In this manner, the execution efficiency of related operations is not high.

In response to this problem, this embodiment of the present disclosure provides a security control method for an application. The method first determines an operation type of a current operation of the application, and determines whether the operation type is a preset operation type, and if the operation type is the preset operation type, calls a preset service, the preset service being configured to enable the application to run in the trusted execution environment, and controls the application to execute the authentication service corresponding to the preset operation type in the trusted execution environment, thereby improving the operation efficiency of the services corresponding to some operation types and improving the user experience while ensuring the security of the operation of the device.

Figure 10:
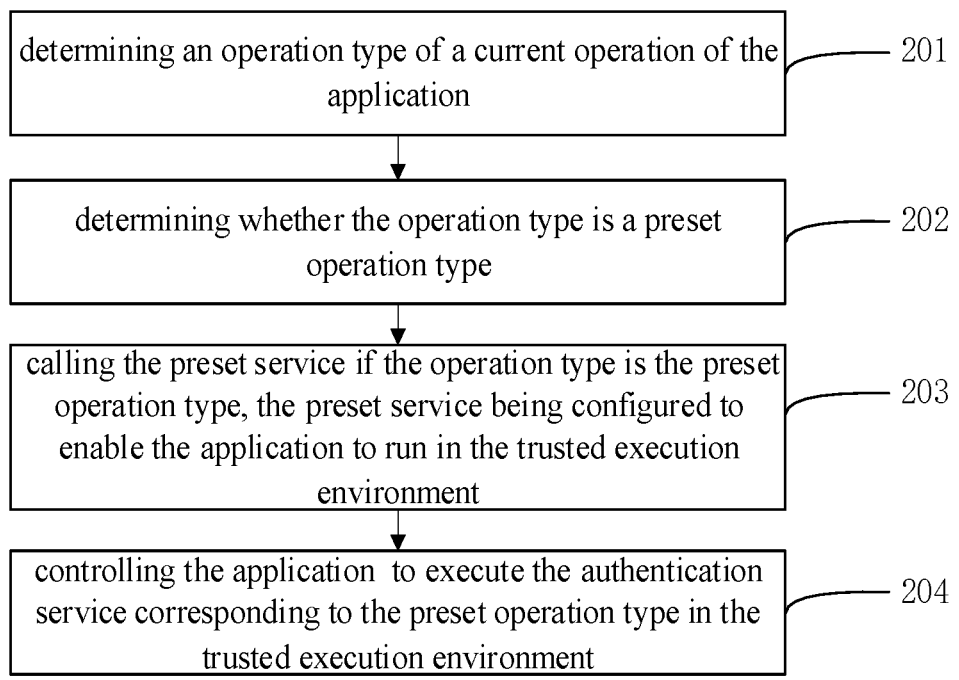
FIG. 10 is a schematic flow chart of a security control method of an application according to embodiments of the present disclosure.

FIG. 10 is a schematic flow chart of a security control method of an application according to embodiments of the present disclosure.

The security control method may be implemented by the electronic device 70.

Referring to FIG. 4, the structure of the electronic device is illustrated.

FIG. 4 is a schematic block diagram of an electronic device 70 according to embodiments of the present disclosure.

As illustrated in FIG. 4, the electronic device 70 includes a laser camera 71, a floodlight 72, a visible light camera 73, a laser light 74, and a microcontroller unit (MCU) 75. The MCU 75 includes a pulse width modulation (PWM) 751, a depth engine 752, a bus interface 753, and a random access memory (RAM) 754.

The PWM 751 is configured to modulate the floodlight 72 to make it emit infrared light, and to modulate the laser light 74 to make it emit laser light, which may have a specific pattern. The laser camera 71 is configured to collect a structured light image or visible image of an imaging object. The structured light image is an image formed by the laser light after being modulated by the imaging object. The depth engine 752 is configured to calculate the depth data corresponding to the imaging object according to the structured light image. The bus interface 753 is configured to send the depth data to the processor, and the executable codes running on the processor use the depth data to perform the corresponding operations. The bus interface 753 includes an MIPI bus interface, an I2C synchronous serial bus interface, and an SPI bus interface.

As illustrated in FIG. 10, the act at block 01 includes the acts at blocks 201 and 202. At block 201, an operation type of a current operation of the application is determined. At block 202, it is determined whether the operation type is a preset operation type.

The running information of the application includes the operation type of the operation of the application, wherein the preset operation type is a type of operation that needs to be performed in the trusted execution environment 76, and the preset operation type may be, for example, an electronic payment type operation, the non-preset operation type may be, for example, an unlocking operation, which is not limited thereto.

The preset operation type in the embodiments of the present disclosure may be set by the user as needed, or may be preset by the factory setting program of the electronic device 70, which is not limited thereto.

In the specific implementation process of the embodiments of the present disclosure, the preset operation type identifier library may be pre-established, and the identifiers of a plurality of preset operation types are recorded in the library. The operating system of the electronic device 70 reads the identifier of the operation type of the current operation of the application, and queries the identifier in the preset operation type identifier library. If the preset operation type identifier library contains the identifier, the operation type of the current operation may be determined to be the preset operation type; otherwise, it is determined that it is not the preset operation type. The acts at blocks 203 and 204 are triggered after determining that the operation type of the current operation is the preset operation type.

The act at block 02 includes the act at block 203. At block 203, if the operation type is the preset operation type, the preset service is called, the preset service being configured to make the application run in the trusted execution environment.

Figure 11:
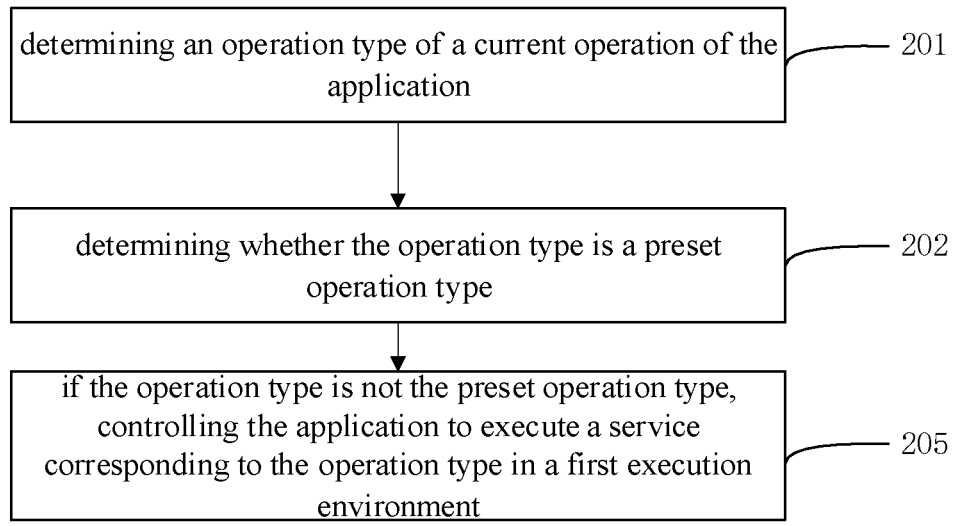
FIG. 11 is a schematic flow chart of a security control method of an application according to embodiments of the present disclosure.

Furthermore, as illustrated in FIG. 11, the act at block 02 may include the act at block 205. At block 205, if the operation type is not the preset operation type, the application is controlled to execute the service corresponding to the operation type in a first execution environment, the first execution environment being different from the trusted execution environment 76.

As illustrated in FIG. 4, in the embodiments of the present disclosure, the first execution environment is, for example, the common execution environment 77, such as a rich media execution environment, which is not limited thereto.

In this embodiment of the present disclosure, if the operation type is not the preset operation type, the application is controlled to execute the service corresponding to the operation type in the first execution environment, in which the first execution environment is different from the trusted execution environment 76, which may effectively improve the execution efficiency of a certain type of operation (e.g., the unlocking operation), thereby improving the user experience. In the trusted execution environment 76, the application is controlled to execute the service corresponding to the operation type, thereby ensuring the security and reliability of the software environment for operation of the device.

The act at block 03 includes the act at block 204. At block 204, the application is controlled to execute the authentication service corresponding to the preset operation type in the trusted execution environment 76.

As illustrated in FIGS. 4-7, explanation of the first embodiment can be applied to the second embodiment, for example, the related technology details and illustration in the acts at blocks 301, 302, 303, 304, 305, 401, 402, 403, 501, 502, 503 and 504, which will not be described herein.

In this embodiment, the operation type of the current operation of the application is determined, and if the operation type is the preset operation type, the preset service is called, the preset service being configured to enable the application to run in the trusted execution environment 76, and the application is controlled to execute the authentication service corresponding to the preset operation type in the trusted execution environment 76, thereby improving the operation efficiency of the services of some operation types and improving the user experience while ensuring the security of the operation of the device.

Embodiments of the present disclosure further provide a security control device of an application.

Figure 12:
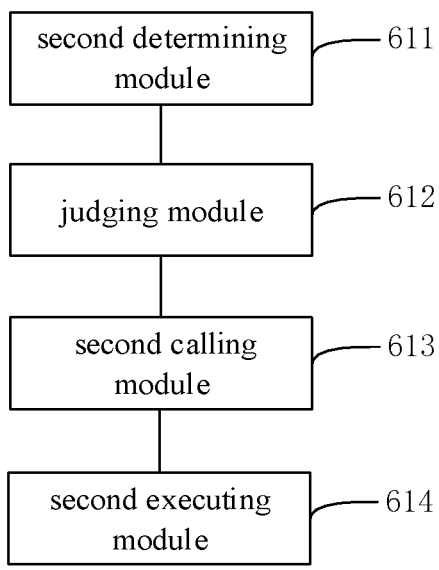
FIG. 12 is a schematic block diagram of a security control device of an application according to embodiments of the present disclosure.

FIG. 12 is a schematic block diagram of a security control device of an application according to embodiments of the present disclosure.

As illustrated in FIG. 8, the determining block 61 includes a second determining module 611, a judging module 612, a second calling module 613 and a second executing module 614.

The second determining module 611 is configured to determine an operation type of the current operation of the application. The judging module 612 is configured to determine whether the operation type is a preset operation type. The second calling module 613 is configured to, if the operation type is the preset operation type, call the preset service, the preset service being configured to enable the application to run in the trusted execution environment. The second executing module 614 is configured to control the application to execute an authentication service corresponding to the preset operation type in the trusted execution environment.

In some embodiments, the second executing module 614 is further configured to, if the operation type is not the preset operation type, control the application to execute a service corresponding to the operation type in the first execution environment, the first execution environment being different from the trusted execution environment.

Figure 13:
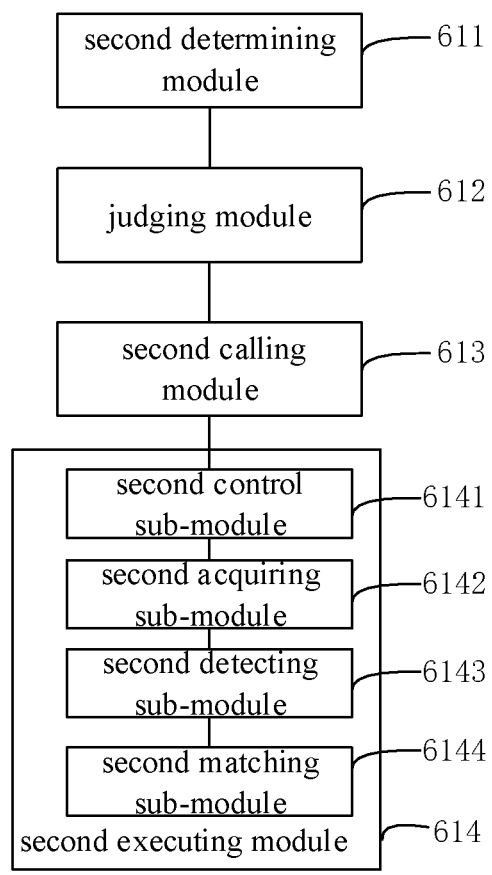
FIG. 13 is a schematic block diagram of a security control device of an application according to embodiments of the present disclosure.

In some embodiments, as illustrated in FIG. 13, the second executing module 614 includes a second control sub-module 6141, a second acquiring sub-module 6142, a second detecting sub-module 6143, and a second matching sub-module 6144.

The second control sub-module 6141 is configured to control the image sensor to image through the dedicated hardware in the trusted execution environment, wherein the image sensor includes the structured light sensor.

The second acquiring sub-module 6142 is configured to acquire imaging data obtained by the image sensor by using the dedicated hardware.

The second detecting sub-module 6143 is configured to perform living body detection according to the imaging data.

The second matching sub-module 6144 is configured to match the structured light depth model in the imaging data with the preset face depth model if the living body detection is passed; and determine that the authentication is passed in response to the structured light depth model matching the preset face depth model.

In a possible implementation of the embodiment, the image sensor further includes an infrared sensor, the imaging data includes an infrared image, and the second detecting sub-module 6143 is further configured to determine whether the imaging object of the infrared image is a living body according to the infrared image in the imaging data.

Further, in a possible implementation of this embodiment, the second detecting sub-module 6143 is further configured to extract the imaging contour from the infrared image, determine the temperature of the imaging object of the infrared image according to local infrared images in the imaging contour, and determine that the imaging object of the infrared image is a living body in response to the imaging contour matching the preset human face contour, and the temperature of the imaging object of the infrared image being within the body temperature range.

In a possible implementation of the embodiment, the image sensor further includes an infrared sensor and a visible light sensor, and the imaging data includes an infrared image and a visible image.

The second detecting sub-module 6143 is further configured to identify a face region in the visible image, and determine a first target region corresponding to the face region in the infrared image; determine a second target region based on the first target region, the second target region containing the first target region and being greater than the first target region; calculate a histogram in the second target region and calculate the contrast according to the histogram; and if the contrast is greater than a threshold, determine that the imaging object of the infrared image and the visible image is a living body.

In a possible implementation of this embodiment, the second control sub-module 6141 is further configured to control an infrared sensor in the image sensor to image, and control the structured light sensor to image in response to the imaging object being determined to be a living body according to the infrared image imaged by the infrared sensor.

In a possible implementation of this embodiment, the second control sub-module 6141 is further configured to synchronously control the infrared sensor and the structured light sensor in the image sensor to image.

In a possible implementation of this embodiment, the second control sub-module 6141 is further configured to control the infrared sensor and the visible light sensor in the image sensor to image, and control the structured light sensor to image in response to the imaging object being determined to be a living body according to the infrared image obtained by the infrared sensor and the visible image obtained by the visible light sensor.

The division of respective modules in the above security control device is for illustrative purposes only. In other embodiments, the security control device may be divided into different modules as needed to complete all or part of the functions of the security control device of the application.

It should be noted that the foregoing illustration of the embodiments of the security control method of the application is also applicable to the security control device of the application of the embodiments, and therefore will not be further described herein.

In the security control device 60 of the application of embodiments of the present disclosure, the operation type of the current operation of the application is determined, and if the operation type is the preset operation type, the preset service is called, the preset service being configured to enable the application to run in the trusted execution environment, and the application is controlled to execute the authentication service corresponding to the preset operation type in the trusted execution environment, thereby improving the operation efficiency of the services of some operation types and improving the user experience while ensuring the security of the operation of the device.

Embodiments of the present disclosure further provide an electronic device 80.

Figure 14:
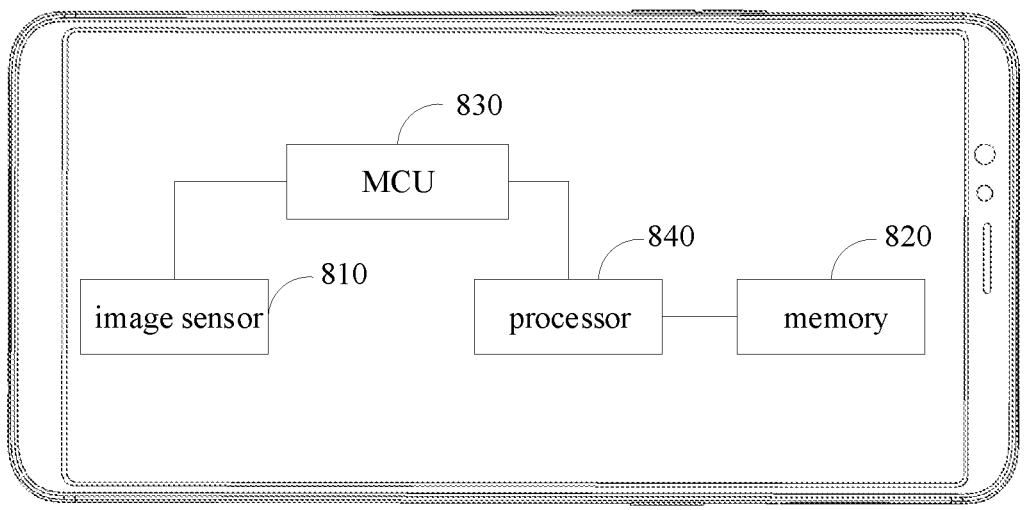
FIG. 14 is a schematic block diagram of an electronic device according to embodiments of the present disclosure.

FIG. 14 is a schematic block diagram of an electronic device 80 according to embodiments of the present disclosure.

In this embodiment, the electronic device 80 includes, but is not limited to, a mobile phone, a tablet computer, and the like.

As illustrated in FIG. 14, the electronic device 80 includes an image sensor 810, a memory 820, an MCU 830, a processor 840, and executable program codes stored on the memory 820 and executable in a trusted execution environment of the processor 840 (not shown in FIG. 14).

The MCU 830 is a dedicated hardware of the trusted execution environment, is coupled to the image sensor 810 and the processor 840 respectively, and is configured to control the image sensor 810 to image, and to transmit the imaging data to the processor 840.

When the processor 840 executes executable program codes, the security control method of the application of the foregoing embodiments is implemented.

In a possible implementation of this embodiment, the MCU 830 communicates with the processor 840 in an encrypted manner.

In this embodiment, the MCU 830 may encrypt the image by using a pixel scrambling method (for pixels in columns and rows). In detail, the MCU 830 may rearrange the pixel information in the original image, and the processor may restore the original image based on a one-to-one correspondence.

The MCU 830 may also adopt chaotic-based image encryption method. In detail, two Logistic chaos sequences are generated, and two Logistics are reconstructed to obtain two y-sequences. The original image is encrypted by replacing values by y1 and y2 sequences. The secret key is the initial state value of the chaos system.

In a possible implementation of this embodiment, the image sensor 810 may include an infrared sensor, a structured light image sensor, and a visible image sensor.

The infrared sensor includes a laser camera and a floodlight. The structured light image sensor includes a laser light, and a laser camera shared with the infrared sensor. The visible image sensor includes a visible light camera.

In a possible implementation of this embodiment, the MCU 830 includes a PWM, a depth engine, a bus interface, and a RAM.

The PWM is configured to modulate the floodlight to make it emit infrared light, and to modulate the laser light to make it emit laser light;

The laser camera is configured to acquire a structured light image of an imaging object.

The depth engine is configured to calculate depth data corresponding to the imaging object according to the structured light image.

The bus interface is configured to transmit depth data to the processor 840, such that the processor 840 executes an authentication service of the application in a trusted execution environment.

For example, the authentication may be executed according to the depth data. For the specific process, reference may be made to the foregoing embodiment, and details are not described herein again.

Figure 15:
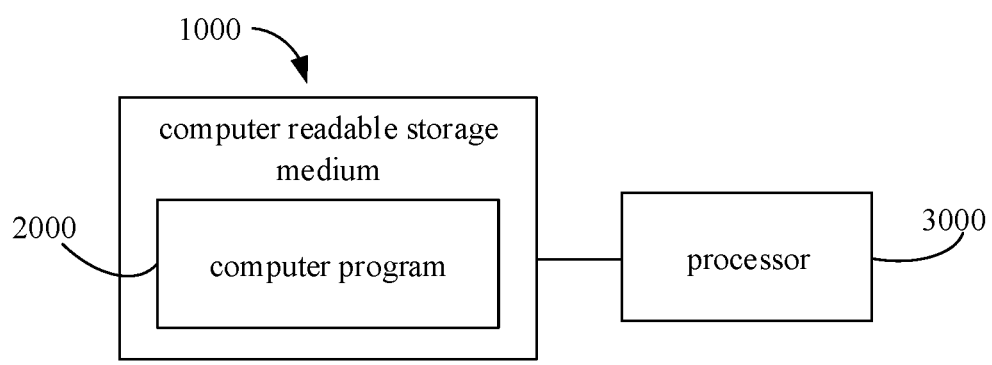
FIG. 15 is a schematic block diagram of a computer readable storage medium according to embodiments of the present disclosure.

As illustrated in FIG. 15, embodiments of the present disclosure further provide a computer readable storage medium 1000 stored thereon with a computer program 2000. When the computer program 2000 is executed by the processor 3000, the security control method of the application according to any of the foregoing embodiments is implemented.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above example method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A security control method of an application, the security control method comprising:
   determining whether running information of the application meets a preset security control condition, wherein determining whether the running information of the application meets the preset security control condition comprises:
      determining whether the application is a preset application; or determining an operation type of a current operation of the application, and determining whether the operation type is a preset operation type;
   calling a preset service based on a determination that the running information of the application meets the preset security control condition, the preset service being configured to enable the application to run in a trusted execution environment, wherein calling the preset service based on the determination that the running information of the application meets the preset security control condition, comprises: calling the preset service based on a determination that the application is the preset application, or based on a determination that the operation type is the preset operation type; and
   executing an authentication service corresponding to the running information of the application in the trusted execution environment, wherein executing the authentication service corresponding to the running information of the application in the trusted execution environment, comprises: executing the authentication service of the application in the trusted execution environment or controlling the application to execute the authentication service corresponding to the preset operation type in the trusted execution environment,
   wherein executing the authentication service corresponding to the running information of the application in the trusted execution environment, comprises:
   controlling an image sensor to capture image by a dedicated hardware of the trusted execution environment, wherein the image sensor comprises a structured light sensor;
   acquiring imaging data obtained by the image sensor by using the dedicated hardware;
   performing a living body detection on an imaging object according to the imaging data;
   matching a structured light depth model in the imaging data with a preset face depth model in response to the living body detection being passed; and
   determining that the authentication is passed in response to the structured light depth model matching the preset face depth model.

2. The security control method according to claim 1, wherein the image sensor further comprises an infrared sensor, the imaging data comprises an infrared image, and performing the living body detection on the imaging object according to the imaging data comprises:
   determining whether the imaging object of the infrared image is a living body based on the infrared image in the imaging data.

3. The security control method according to claim 2, wherein determining whether the imaging object of the infrared image is the living body based on the infrared image in the imaging data, comprises:
   extracting an imaging contour from the infrared image;
   determining a temperature of the imaging object of the infrared image according to local infrared images in the imaging contour; and
   determining the imaging object of the infrared image to be the living body in response to the temperature of the imaging object of the infrared image being within a human body temperature range and the imaging contour matching a preset face contour.

4. The security control method according to claim 1, wherein the image sensor further comprises an infrared sensor and a visible light sensor, the imaging data comprises an infrared image and a visible image, and performing the living body detection on the imaging object according to the imaging data comprises:
   identifying a face region in the visible image, and determining a first target region corresponding to the face region in the infrared image;
   determining a second target region according to the first target region, the second target region containing the first target region and being greater than the first target region;
   calculating a histogram in the second target region and calculating a contrast according to the histogram; and
   determining that the imaging object of the infrared image and the visible image is the living body in response to the contrast being greater than a threshold.

5. The security control method according to claim 2, wherein controlling the image sensor to image comprises:
   controlling the infrared sensor in the image sensor to image, and controlling the structured light sensor to image in response to the imaging object being determined to be the living body according to the infrared image obtained by the infrared sensor; or synchronously controlling the infrared sensor and the structured light sensor in the image sensor to image.

6. The security control method according to claim 4, wherein controlling the image sensor to image comprises:

controlling the infrared sensor and the visible light sensor in the image sensor to image; and controlling the structured light sensor to image in response to the imaging object being determined to be the living body according to the infrared image obtained by the infrared sensor and the visible image obtained by the visible light sensor.

7. The security control method according to claim 1, further comprising:

controlling the application to execute a service corresponding to the operation type in a first execution environment based on a determination that the operation type is not the preset operation type, the first execution environment being different from the trusted execution environment.

8. A security control device of an application, comprising:

a processor, wherein a trusted execution environment runs;

a memory, configured to store program codes executable in the trusted execution environment;

wherein the processor is configured to read the program codes stored in the memory, so as to:

determine whether running information of the application meets a preset security control condition;

call a preset service based on a determination that the running information of the application meets the preset security control condition, the preset service being configured to enable the application to run in the trusted execution environment; and execute an authentication service corresponding to the running information of the application in the trusted execution environment, wherein the processor is configured to:

determine whether the application is a preset application;

call the preset service based on a determination that the application is determined to be the preset application; and execute the authentication service of the application in the trusted execution environment, wherein the processor is configured to:

control an image sensor to image by a dedicated hardware in the trusted execution environment, wherein the image sensor comprises a structured light sensor;

acquire imaging data obtained by the image sensor by using the dedicated hardware;

perform a living body detection according to the imaging data;

match a structured light depth model in the imaging data with a preset face depth model in response to the living body detection being passed; and determine that an identity authentication is passed in response to the structured light depth model matching the preset face depth model.

9. The security control device according to claim 8, wherein the processor is configured to:

determine an operation type of a current operation of the application;

determine whether the operation type is a preset operation type;

call the preset service based on the determination that the operation type is the preset operation type, the preset service being configured to enable the application to run in the trusted execution environment; and control the application to execute the authentication service corresponding to the preset operation type in the trusted execution environment.

10. The security control device according to claim 9, wherein the processor is further configured to, control the application to execute a service corresponding to the operation type in a first execution environment based on a determination that the operation type is not the preset operation type, the first execution environment being different from the trusted execution environment.

11. An electronic device, comprising:

an image sensor;

a processor, wherein a trusted execution environment runs;

a memory, configured to store program codes executable in the trusted execution environment; and a Microcontroller Unit (MCU), configured to be a dedicated hardware of the trusted execution environment, coupled to the image sensor and the processor respectively, and configured to control the image sensor to image and to transmit imaging data of the image sensor to the processor;

wherein the processor is configured to implement a security control method of an application in response to executing the program codes stored in the memory, the method comprising:

determining whether running information of the application meets a preset security control condition;

calling a preset service based on a determination that the running information of the application meets the preset security control condition, the preset service being configured to enable the application to run in the trusted execution environment; and executing an authentication service corresponding to the running information of the application in the trusted execution environment, wherein the processor is configured to:

extract an imaging contour from an infrared image;

determine a temperature of the imaging object of the infrared image according to local infrared images in the imaging contour; and determine the imaging object of the infrared image to be the living body in response to the temperature of the imaging object of the infrared image being within a human body temperature range and the imaging contour matching a preset face contour;

determine whether an imaging object is a living body according to an infrared image obtained by the infrared sensor; and control the structured light sensor to image in response to determining that the imaging object is the living body.

12. The electronic device according to claim 11, wherein the image sensor comprises a structured light sensor and an infrared sensor; and the processor is configured to:

control the infrared sensor to image;

determine whether an imaging object is a living body according to an infrared image obtained by the infrared sensor; and control the structured light sensor to image in response to determining that the imaging object is the living body.

13. The electronic device according to claim 11, wherein the image sensor comprises a structured light sensor and an infrared sensor; and
    the processor is configured to synchronously control the infrared sensor and the structured light sensor to image.

14. The electronic device according to claim 11, wherein the image sensor comprises an infrared sensor, a visible light sensor and a structured light sensor; and
    the processor is configured to:
        control the infrared sensor and the visible light sensor to image; and
        determine whether an imaging object is a living body according to an infrared image obtained by the infrared sensor and a visible image obtained by the visible light sensor; and
        control the structured light sensor to image in response to determining that the imaging object is the living body.

15. The electronic device according to claim 14, wherein the processor is configured to:
    identify a face region in the visible image, and determine a first target region corresponding to the face region in the infrared image;
    determine a second target region according to the first target region, the second target region containing the first target region and being greater than the first target region;
    calculate a histogram in the second target region and calculate a contrast according to the histogram; and
    determine that the imaging object of the infrared image and the visible image is the living body in response to the contrast being greater than a threshold.

* * * * *